June 6, 1939.  A. TRASK  2,161,769
DISCHARGE VALVE FOR COMPRESSORS AND THE LIKE
Filed March 23, 1936
Fig-1
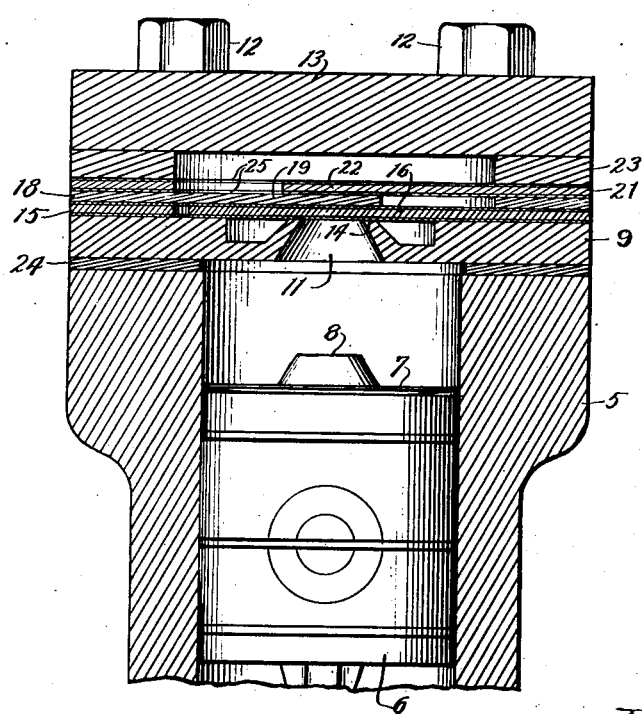
Fig-2
Fig-3
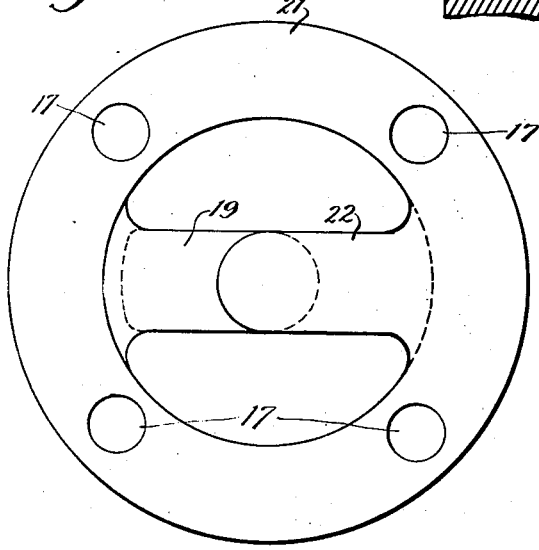
Inventor.
Allen Trask.
By:
Atty.

Patented June 6, 1939

2,161,769

UNITED STATES PATENT OFFICE 2,161,769

DISCHARGE VALVE FOR COMPRESSORS AND THE LIKE

Allen Trask, Chicago, Ill., assignor to Mills Novelty Company, Chicago, Ill., a corporation of Illinois Application March 23, 1936, Serial No. 70,257

8 Claims. (Cl. 251—119)

This invention relates to valves and more particularly it relates to cylinder head valves, such as discharge valves for compressors, and the like.

An important object of the invention is to provide a discharge valve for a compressor or the like, in which quietness of operation is accomplished through the provision of an improved form of damping means which acts to prevent excessive vibration of the valve at the comparatively high speeds required for efficient compressor operation.

Another object of the invention is to provide in a valve structure of the character referred to, a valve element which is formed as an integral part of a disc which is adapted to be secured in position by cylinder head bolts which extend through holes in the valve disc, such holes being so placed that they will register with the bolt holes in the cylinder and cylinder head.

Another object of the invention to provide in a cylinder head valve structure a valve disc which is secured in position by bolts which extend through the cylinder head into the cylinder, and in combination therewith a valve dampener which is made integral with a disc which is also provided with holes for receiving the cylinder head bolts so that it will be held in place by the same set of bolts which align the valve disc.

A further object of the invention is to provide in a discharge valve for a compressor or the like, a valve plate having a flexible valve arranged thereon to extend over a valve seat formed in the plate, and in combination therewith a damping element which is arranged to engage over the valve to hold the free end thereof in sliding contact with the valve plate while an intermediate portion of the valve is permitted to move to open position.

A still further object of the invention is to provide means for preventing leaking between the several parts which are disposed between the cylinder and the cylinder head, namely, the valve plate, the valve disc which rests on the valve plate, and the damping elements which are interposed between the valve disc and the cylinder head.

Other objects and advantages of the invention will be apparent from the following detailed description, taken in connection with the accompanying drawing, wherein I have shown the preferred form in which I have thus far contemplated applying the principles of the invention.

Referring to the drawing:

Fig. 1 is a vertical sectional view through the upper portion of the cylinder of a compressor having the improved discharge valve embodied therein;

Fig. 2 is a fragmentary sectional view through the valve, the view illustrating the valve is in the open position; and Fig. 3 is a plan view of the valve with the parts in the closed position of Fig. 1.

Referring to the drawing in detail, numeral 5 designates the upper portion of the cylinder of a compressor, the cylinder piston being indicated at 6. A flexible disc intake valve 7 is secured by a valve button 8 to the head of the piston 6. A valve plate 9, having a discharge opening 11 formed therein, is clamped to the cylinder 5 by cylinder head bolts 12, said valve plate being provided with bolt holes which are in registration with corresponding holes in a cylinder head plate 13, the bolts 12 thus serving to align and clamp said valve plate 9 to the cylinder 5. The walls of the discharge opening 11 in valve plate 9 terminate in a centrally located valve seat 14 which is lapped flush with the upper face of the valve plate.

The parts of the valve and cylinder head which have been described up to this point are of conventional form. In accordance with my invention, the discharge opening 11 in valve plate 9 is opened and closed by a reed valve which, in the embodiment shown, comprises an annular spring-steel disc 15 having an integral flapper valve 16 extending radially inwardly from one side of the disc to a point in close proximity to the other side thereof. The disc 15 is provided with holes 17 (Fig. 3) for receiving head bolts 12, said holes 17 being aligned with the corresponding holes in valve plate 9, so that the flapper valve 16 will rest on the centrally located valve seat 14, as clearly shown in Fig. 1. Located immediately above valve disc 15 is an annular flapper disc 18 having an integral damping flapper 19 extending radially inwardly from one side of the disc to a point slightly beyond the center thereof. A second annular damping flapper disc 21 is disposed immediately above the disc 18, said disc 21 being similarly provided with an integral flapper 22 which extends radially inwardly from one side of the disc to a point slightly beyond the center thereof, as illustrated in Fig. 1. The damping flapper discs 18 and 21 are each provided with holes 17 which register with the corresponding holes in valve plate 9 and valve disc 15, so that when the bolts 12 are in position said damping discs will be held in alignment with the valve disc 15 and valve plate 9.

It will be noted from Fig. 1 that the first damping disc 18 is positioned so that the flapper 19 is diametrically disposed relative to the flapper valve 16, overlapping the free end of said valve so that when the valve is in the closed position of Fig. 1 the free end of the valve will rest on the upper surface of valve plate 9. It will be further noted that the second damping flapper 22 is diametrically disposed with respect to the first damping flapper 19, overlapping the free end of the latter as clearly shown in Fig. 1. A head gasket 23 is placed between damping flapper disc 21 and cylinder head plate 13. This gasket is made of such thickness as will provide the desired space for lift of the flapper valve and damping flappers. This gasket is also provided with holes 17 which are engaged by the bolts 12 to align it with the underlying parts.

During the suction and compression portions of a cycle the valve 16 remains in its normal flat position on the valve seat, as shown in Fig. 1. During the discharge portion of the cycle the free end of the valve is held in sliding frictional contact with valve plate 9 by the fixed end of the first damping flapper 19, the portion of the valve which overlies the valve seat 14 being raised to the position of Fig. 2 under the pressure developed in the discharge chamber to allow passage of the discharge fluid. It will be noted that in this position the valve is arched over the discharge opening 11 and the valve seat 14 while the free edge portion of said valve remains in contact with the valve plate 9. The sliding of the free end of the valve 16 on valve plate 9 from the position of Fig. 1 to the position of Fig. 2, while said free end portion remains in frictional contact with the fixed portion of damping flapper 19, causes a damping or shock-absorbing action on the valve which enables the valve to function at high speed with comparatively little sound. In flexing upwardly to the open position of Fig. 2, the valve 16 raises the tip of the first damping flapper 19, and the latter, in turn, raises the tip of the second damping flapper 22, causing the latter to move upwardly until it engages the underface of cylinder plate 13, the latter serving as a stop for limiting the movement of the valve and damping elements. Since the valve 16 and the damping flappers 19 and 22 are secured to the opposite sides of their respective discs, there is a frictional sliding of these parts at their points of contact with one another which is caused by their motion along arcs which extend in opposite directions at said points of contact. This frictional damping action of the damping flappers upon one another, and upon the valve, tends to promote quiet operation of the valve, particularly at high speed operation.

In order to prevent leakage, I employ a soft gasket metal, such as lead, tin, cadmium or the like, as a seal between the several parts of the assembly. The seal between valve plate 9 and the cylinder 5 is provided by a valve plate gasket 24, said gasket also being provided with holes 17 (Fig. 3) which are positioned to register with the corresponding holes in the valve plate and cylinder. In the embodiment shown, valve disc 15, and damping flapper discs 18 and 21, are sealed between valve plate 9 and gasket 23 by providing on either side of valve disc 15, and the second damping disc 21, an electroplated coating of gasket metal 25 (Fig. 2). This coating is very thin, and being formed of a soft metal such as lead, will provide a gas-tight seal around the perimetrical edge portions of the discs when the latter are clamped in position by head bolts 12. The intermediate flapper disc 18 need not be electroplated since it is adequately sealed by the coatings provided on discs 15 and 21. The head gasket 23 may itself be made of a suitable gasket metal such as lead, so that it is unnecessary to provide a sealing coating between it and head plate 13.

It will be noted from Figs. 1 and 2 that the coating 25 on valve disc 15 is also applied to the underface of valve 16. The valve is mounted so that the portion thereof which engages valve seat 14 will always engage the latter in exactly the same position upon repeated seatings of the valve. The soft coating of gasket metal carried on the underface of the valve flows under the action of repeated contacts of the valve with the valve seat, becoming conformed to the shape of the valve seat, and any imperfections, tool marks, etc., formed therein. After this plated coating becomes shaped to the valve seat it will provide a gas-tight seal when the valve is in the seated position.

The feature of having the valve and associated damping elements formed as integral parts of discs which are centered on the cylinder by the cylinder bolts greatly simplifies fabrication and assembly. The several parts are merely superposed in the proper order and the entire assembly is then clamped in position by the cylinder head bolts which serve to align the parts in exactly the proper relationship. The feature of having the flapper valve and damping flappers arranged in overlapping relationship in the manner described, so that upon opening and closing of the valve these parts will move in frictional engagement with one another along the arcs of oppositely extending circles, makes for extremely quiet operation at the high speeds which are required in compressor operation.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In a valve structure, a valve plate, a valve seat in said plate, a valve disc having a flexible flapper valve extending inwardly from an edge portion of the disc along the diameter of a circular opening formed in said disc, means for securing said disc on the plate in position to align the valve with said valve seat, a damping flapper, and means for securing said flapper over the valve with the free end of the flapper in frictional engagement with the movable portion of the valve, said valve and damping flapper being secured, respectively, at diametrically opposed sides of the valve seat and the damping flapper engaging the free portion of the valve, thus tending to hold the end thereof always in contact with the valve plate.

2. In a valve structure, a valve plate, a valve seat in said plate, a valve disc having a flexible flapper valve extending inwardly from an edge portion of the disc along the diameter of a circular opening formed therein, means for securing said disc on the plate in position to align the valve with said valve seat, a damping flapper, means for securing said flapper over the valve with the free end of the flapper in frictional engagement with the movable portion of the valve, said valve and damping flapper being secured, respectively, at diametrically opposed sides of the valve seat and the damping flapper engaging the free portion of the valve, thus tending to hold the end thereof always in contact with the valve plate. and a second damping flapper and supporting means therefor for holding the same in diametrically opposed relation to said first damping flapper and with the free end thereof in overlapping engagement with the free end of said first damping flapper.

3. In a valve structure, the combination with a cylinder and cylinder head, of a valve plate disposed between the cylinder and cylinder head, a valve seat in said plate, a valve disc having a flexible flapper valve extending inwardly from an edge portion of the disc along the diameter of a circular opening formed therein, means for securing said disc on the plate in position to align the valve with said valve seat, a damping flapper, means for securing said flapper over the valve with the free end of the flapper in frictional engagement with the movable portion of the valve, said valve and damping flapper being secured, respectively, at diametrically opposed points on opposite sides of the seat opening and the damping flapper engaging the free end of the valve to hold the latter always in contact with the valve plate, a second damping flapper and supporting means therefor for holding the same in diametrically opposed relation to the first damping flapper, and with the free end thereof in overlapping engagement with the free end of said first damping flapper, and means for spacing the cylinder head from the valve plate at such distance that said head will serve as a stop to limit the movement of the second damping flapper.

4. In a valve structure, a valve plate having a valve seat formed therein, a flexible flapper valve disposed to seat on said valve seat, a damping flapper disposed over said valve, and means for securing one end of said valve and the damping flapper to the valve plate, said valve and damping flapper being secured to the valve plate on opposite sides of the valve seat and the damping flapper serving to hold the free edge of said valve in contact with the valve plate when the valve is flexed to unseat the same.

5. In a valve structure, a valve plate having a valve seat formed therein, a flexible valve, means for securing an edge portion of said valve to the valve plate, the unsecured portion of the valve extending over the valve seat, with the free portion thereof disposed in contact with the valve plate, and damping means disposed over said valve and engaging the free edge portion thereof for holding the same in sliding frictional contact with the valve plate while allowing the portion of the valve over the valve seat to arch to the open position said damping means being secured in fixed relation to the valve plate at a point spaced from the point of attachment of the valve.

6. In a fluid compressor including a cylinder, a cylinder head, a valve plate having a valve seat therein, and means for clamping a valve disc above said valve plate: a flat reed valve disposed, when seated, in contact with said valve plate and seat with one end in fixed relation thereto, and a damping reed in contact with said valve with one end thereof fixed relative to the valve plate at a point near the free end of said valve, said damping reed retaining the free end of said valve in continuous frictional contact with said valve plate during opening and closing in such manner that discharge fluid passing through the valve opening will cause said valve to arch above said seat.

7. In a fluid compressor including a cylinder, a cylinder head, a valve plate having a valve seat therein, and means for clamping a valve disc above said valve plate: a flat reed valve fixed at one end relative to said valve plate and disposed normally in contact with said valve seat, and a damping reed overlying said valve and fixed at one end on the opposite side of the valve seat from the fixed end of the valve, said damping reed retaining the free end of said valve in sliding frictional contact with the valve plate in such manner that said valve is caused to arch above said valve seat in opening.

8. In a fluid compressor including a cylinder, a cylinder head, a valve plate having a valve seat therein, and means for clamping a valve disc above said valve plate: a flat reed valve fixed at one end relative to said valve plate and disposed normally in contact with said valve seat, a damping reed overlying said valve and fixed at one end on the opposite side of the valve seat from the fixed end of the valve, said damping reed retaining the free end of said valve in sliding frictional contact with the valve plate in such manner that said valve is caused to arch above said valve seat in opening, and a second damping reed in diametrically opposed relation to said first mentioned damping reed and engaging the free end thereof to limit the extent of arching movement of said valve.

ALLEN TRASK.